(12) United States Patent
Power et al.

(10) Patent No.: US 11,906,812 B2
(45) Date of Patent: Feb. 20, 2024

(54) ACTIVELY COOLED OPTICAL SUBSTRATES FOR HIGH AVERAGE POWER REFLECTIVE OR DIFFRACTIVE OPTIC

(71) Applicant: University of Rochester, Rochester, NY (US)

(72) Inventors: Erik P. Power, Rochester, NY (US); Jake Bromage, Rochester, NY (US); Jonathan D. Zuegel, Rochester, NY (US)

(73) Assignee: University of Rochester, Rochester, NY (US)

( * ) Notice: Subject to any disclaimer, the term of this patent is extended or adjusted under 35 U.S.C. 154(b) by 503 days.

(21) Appl. No.: 17/167,724

(22) Filed: Feb. 4, 2021

(65) Prior Publication Data

US 2021/0257798 A1 Aug. 19, 2021

Related U.S. Application Data

(60) Provisional application No. 62/969,905, filed on Feb. 4, 2020.

(51) Int. Cl.
*G02B 7/18* (2021.01)

(52) U.S. Cl.
CPC .................................. *G02B 7/1815* (2013.01)

(58) Field of Classification Search
CPC .................................. F28F 3/12; G02B 7/1815
See application file for complete search history.

(56) References Cited

U.S. PATENT DOCUMENTS

| | | | | |
|---|---|---|---|---|
| 4,443,059 A | * | 4/1984 | Wells | F28F 3/12 359/845 |
| 2019/0033499 A1 | * | 1/2019 | Van Berkel | G03F 7/70891 |

OTHER PUBLICATIONS

D. A. Alessi, et al. "Low-dispersion low-loss dielectric gratings for efficient ultrafast laser pulse compression at high average powers," Opt. Laser Technol. 117, 239-243 (2019).
C. He et al., "Fabrication of water-cooled silicon mirror by direct laser sintering," Opt. Express 22, 9902-9911 (2014).
J. Sugawara et al., "Manufacturing aspheric mirrors made of zero thermal expansion cordierite ceramics using magnetorheological finishing (MRF)," Proc. SPIE 9912, 99120L (2016).
V. Leroux, et al. "Wavefront degradation of a 200 TW laser from heat-induced deformation of in-vacuum compressor gratings," Opt. Express 26, 13,061-13,071 (2018).

* cited by examiner

*Primary Examiner* — Elizabeth J Martin
(74) *Attorney, Agent, or Firm* — Wissing Miller LLP

(57) ABSTRACT

Integrated active cooling of high-power reflective or diffractive optics uses substrates manufactured from low-expansion ceramics to flow coolant between the back surface of the substrate and chambers behind but adjacent a reflective front surface, in a direction transverse to the front surface, to thereby achieve much greater average power handling than known cooling techniques.

22 Claims, 10 Drawing Sheets
(5 of 10 Drawing Sheet(s) Filed in Color)

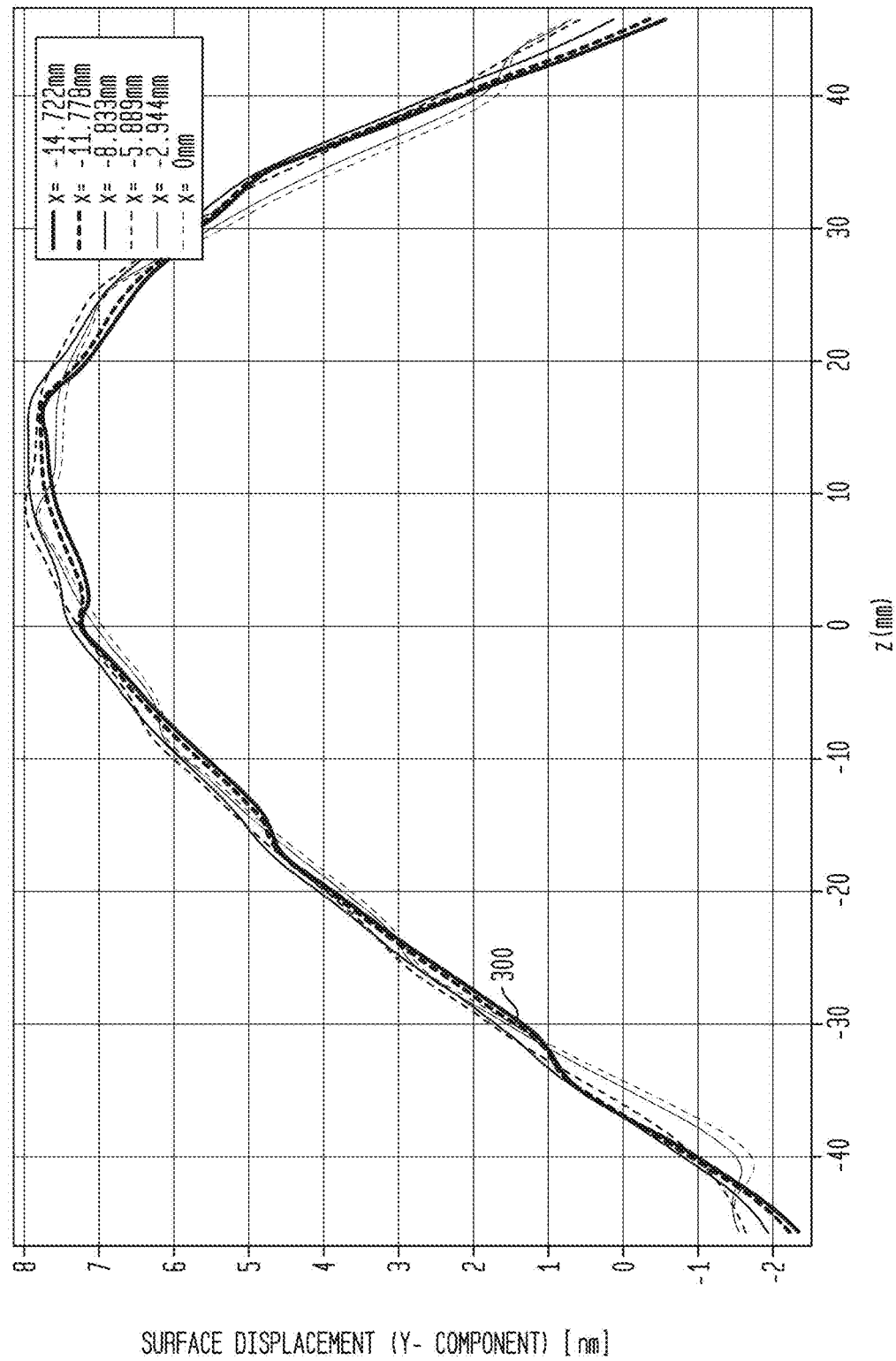

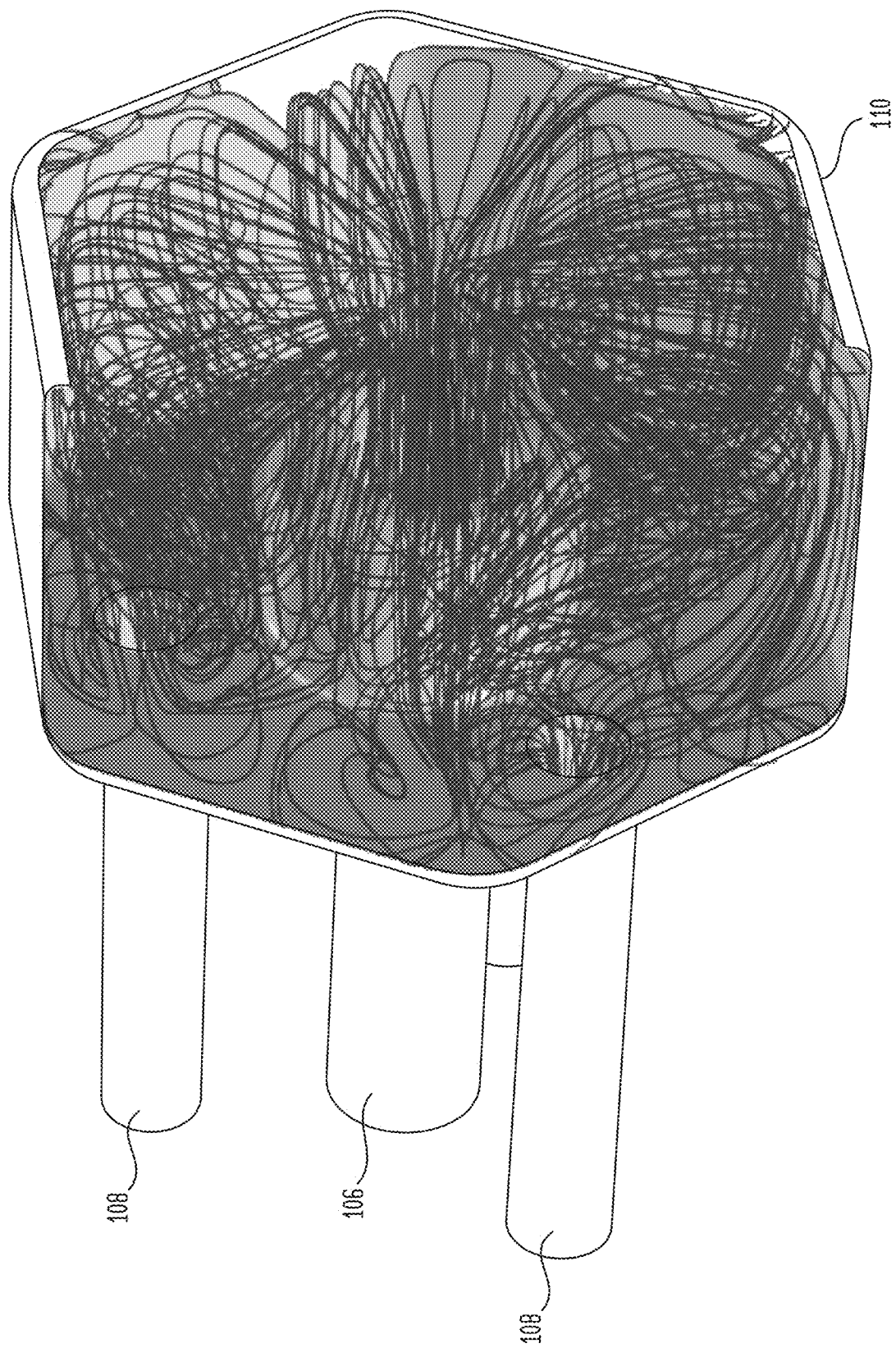

ACTIVELY COOLED OPTICAL SUBSTRATES FOR HIGH AVERAGE POWER REFLECTIVE OR DIFFRACTIVE OPTIC

REFERENCE TO RELATED APPLICATIONS

This patent application claims the benefit of and incorporates by reference U.S. Provisional Application 62/969,905, filed on Feb. 4, 2020.

GOVERNMENT RIGHTS

This invention was made with government support under DE-SC0019496 awarded by the Department of Energy. The government has certain rights in the invention.

FIELD

This patent specification relates to optic devices and methods and more particularly to reflective or diffractive optics and reducing heat-induced degradation even when operating at high average power.

BACKGROUND

Average power handling capabilities of traditional optic and optical systems are challenged, and often exceeded, by advances in laser technology. High peak power, low repetition rate laser systems continue to provide proof-of-concept results for new laser-based applications. Examples include laser-wakefield acceleration (staged) of electrons and positrons as a replacement technology for existing synchrotron-scale systems, THz generation, surface whetting and other femtosecond surface treatments, etc. To realize practical, commercial applications in these fields requires lasers that provide both high peak power and high repetition rate, preferably 1 kHz and above.

At high repetition rate, laser system components must be re-evaluated for resilience to thermal degradation or failure. Optical absorption is generally calculated as a fraction of incident energy—in the case of high repetition rate systems, this typically is converted to an absorbed optical power. Thermal expansion can lead to surface deformation, altering, for example, the power of a lens or reflected wavefront of a mirror. For diffraction gratings used in pulse compressors, the grating surfaces located in the spectrally dispersed beam are important: a thermally varying surface will lead not only to spatial beam variation, but an undesired and likely uncorrectable spatially-dependent phase term degrading the temporal quality of the compressed pulse.

Low-absorption multi-layer dielectric (MLD) coatings have been proposed to handle >100 nm bandwidth; used as mirror coatings, these coatings can allow reflection of >99% of the incident optical power. The resulting low level of optical absorption translates to a natively high average power handling capability for these designs (multi-kW), without active thermal control. For ultra-broadband systems, however, metal or hybrid metal-dielectric coatings are required to accommodate the laser spectrum. These coatings support the required bandwidth at a cost of absorption in the percent to few percent range.

Diffraction gratings are similarly categorized into MLD vs metal or hybrid designs. MLD gratings are suitable for long-pulse systems, where the narrow bandwidth of the grating designs is acceptable and does not clip the pulse spectrum. Pulse compressors using low-loss MLD gratings can typically support pulses with duration >40 fs, however herculean efforts can be needed to reduce the duration to the 30 fs range. Most known high peak power lasers in use today are believed to make use of gold-coated diffraction gratings, which support >100 nm bandwidth. This allows compression of pulses <20 fs in duration, at a cost of ~5% absorption per grating.

For lasers possessing large bandwidths, metal or hybrid gratings are currently the only known available option. However, the large absorption of these coatings presents a significant barrier to use of standard gratings in high average power applications. For example, a laser producing 4 J pulses at 1 kHz after the final amplifier can deposit 5% of its power on the 1st grating (assuming a gold grating in vacuum with no active cooling): this is 200 W of thermal power dumped into the optical substrate, with no easy path for heat removal. Even low-expansion materials (ULE glasses, ceramics) will deform beyond acceptable tolerances. Additionally, the surface temperature will exceed many hundreds of degrees, likely leading to coating failure.

A first-guess attempt at thermal management may be to remove heat from the back surface using e.g. a water-cooled copper block behind the optic. This, however, is not expected to work because thermal conductivity of real materials cannot be infinite. For finite conductivity, a temperature gradient exists between the front and back surfaces. The hotter front surface will expand, while the cooler back surface will expand less (or not at all, or contract, depending on back surface temperature). While the front surface temperature can be held to values that are "coating safe," the difference in surface temperatures can accentuate the outward bowing of the front surface due to thermal expansion.

A group at Livermore has reported cooling using cold bars attached to the top and bottom of an optic, also known as edge cooling, providing a 3-fold improvement in power-handling capability. See D. A. Alessi, H. T. Nguyen, J. A. Britten, P. A. Rosso, and C. Haefner, "Low-dispersion low-loss dielectric gratings for efficient ultrafast laser pulse compression at high average powers," Opt. Laser Technol. 117, 239-243 (2019). This approach is believed to be limited by the nature of the proposed materials and geometry because optical glasses traditionally used in most known mirror and grating applications suffer from poor thermal conductivity. This limits the maximum tolerable average power, since the thermal gradient and subsequent material expansion grow with increasing power application.

Some optic with integrated cooling channels are commercially available but exclusively for use with mid-IR and far-IR laser systems, most commonly high-power $CO_2$ lasers. The extremely long wavelength of these lasers means that tolerances on the allowable deformation of the optical surface can be on the scale of 1 micrometer. High power far-IR systems can therefore use simple cooled mirrors made from copper with a few fluid channels milled into the bulk. At visible/near-IR wavelengths, those most typically used for high peak power lasers, tolerances on surface deformation scale down with wavelength reduction. For an 800 nm system (Ti:sapphire laser), the upper limit for thermal deformation is 80 nm, and preferably is even lower, especially if the substrate is to be used as a pulse compression grating and spatio-temporal coupling is a concern.

A coppery heat sink with micropores and sub-millimeter channel fabricated by direct laser sintering on the back of a silicon mirror is discussed in C. He, H. Zhu and PP. Hu, Fabrication of water-cooled silicon mirror by direct laser sintering, Opt. Express 22, 9902-9911 (2014). To overcome thermal stress due to the difference in thermal properties between the Si substrate and the coppery heat sink, the authors propose stress transition layers that are 0.5 mm thick and report thermal deformation of the mirror of 0.65 micrometers (650 nm) if the net absorbed laser power density id $5.3 \times 10^5$ W/m$^2$ using a COHERENT K250 CO$_2$ laser.

The references cited throughout this patent specification are hereby incorporated by reference.

The new approach described in this patent specification is targeted at high average power laser systems requiring broadband metal or hybrid metal-dielectric mirrors and/or gratings capable of operating with visible light, where no known technology exists to handle the heat deposited in the optic. Other applications exist, however: one example is MLD gratings used for spectral beam combining in directed energy applications (e.g., many spectrally diverse fiber lasers combined into a single beam using a grating).

SUMMARY

According to some embodiments, an actively cooled optic device comprises: a substrate having a front configured to reflect or diffract visible or near-IR light and a back; a plurality of individual chambers in said substrate recessed from said front by no more than a few mm; and passages that connect said back to said chambers and are configured for coolant flow between said back and said chambers; wherein said passages comprise at least one inlet passage and at least one outlet passage from said back to each of said chambers.

The passages associated with each respective chamber can be configured for coolant flow transverse to said front face that maintains said front surface at flatness of $<\frac{1}{10}^{th}$ wavelenth thermal deformation at absorbed power density greater than 100 mW/cm$^2$ in response to illumination with visible or near-IR light in ambient temperature no less than 10° C.

The substrate can be cordierite, silicon carbide or other machinable, bondable, and optically-polishable material with low or ultra-low thermal expansion coefficient and moderate to high thermal conductivity.

The chambers can be recessed from said front by no more than 5 mm, or by no more than 2 mm. The chambers have dimensions no more than 2 cm in a section parallel to said front and can be arranged in a periodic array. For each of said chambers, the passages can comprise a central inlet passage and plural outlet passages spaced regularly near a perimeter of the chamber. The inlet passages can be configured for inflow of coolant at velocity in the range of at least 10 cm/sec. The front of the device preferably deforms by no more than 100 nm at absorbed power density greater than 100 mW/cm$^2$.

In some embodiments, an actively cooled optic device comprises: a substrate that has a front configured to reflect or diffract visible or near-IR light and a back and a plurality of chambers recessed from said front; inlet passages and outlet passages extending from said back surface to said chambers in a direction transverse to said front; wherein at least one inlet passage and at least one outlet passage are in coolant flow communication with each of said chambers. In some embodiments, the actively cooled optic device comprises cordierite and more generally it comprises a material selected from the group of silicon carbide and other machinable, bondable, and optically-polishable material with low or ultra-low thermal expansion coefficient and moderate to high thermal conductivity. Said chambers preferably are recessed from said front by no more than 5 mm, and preferably have dimensions no more than 2 cm in a section parallel to said front. Said inlet passages preferably are configured for inflow of coolant at velocity in the range of at least 10 cm/sec.

In some embodiments, a method of actively cooling an optic device comprising a substrate with a front configured to reflect or diffract visible or near-IR light and a back, comprises the steps of: forming a pattern of chambers in said substrate recessed from but adjacent said front; forming coolant inlet and outlet passages extending from said back surface to said chambers, wherein at least one of said inlet passages and at least one of said outlet passages extend to each of said chambers; and flowing coolant to said chambers through said inlet passages and exhausting coolant from said chambers through said outlet passages to maintain said front surface at a desired temperature range at absorbed power density greater than 100 mW/cm$^2$. The step of forming said pattern preferably comprises forming the pattern in cordierite substrate, or more generally in a substrate selected from the group of silicon carbide and other machinable, bondable, and optically-polishable material with low or ultra-low thermal expansion coefficient and moderate to high thermal conductivity. The step of forming said chambers preferably comprises recessing said chambers no more than 5 mm from said front surface of the substrate, and more preferably no more than 2 mm from said front surface of the substrate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3(b) illustrates displacements at a front of an optic device according to some embodiments.

FIG. 5 illustrates velocity streamlines in a flow cell according to some embodiments.

DETAILED DESCRIPTION

A detailed description of examples of preferred embodiments is provided below. While several embodiments are described, the new subject matter described in this patent specification is not limited to any one embodiment or combination of embodiments described herein, but instead encompasses numerous alternatives, modifications, and equivalents. In addition, while numerous specific details are set forth in the following description in order to provide a thorough understanding, some embodiments can be practiced without some or all these details. Moreover, for the purpose of clarity, certain technical material that is known in the related art has not been described in detail in order to avoid unnecessarily obscuring the new subject matter described herein. It should be clear that individual features of one or several of the specific embodiments described herein can be used in combination with features of other described embodiments or with other features. Further, like reference numbers and designations in the various drawings indicate like elements.

Figure 1A:
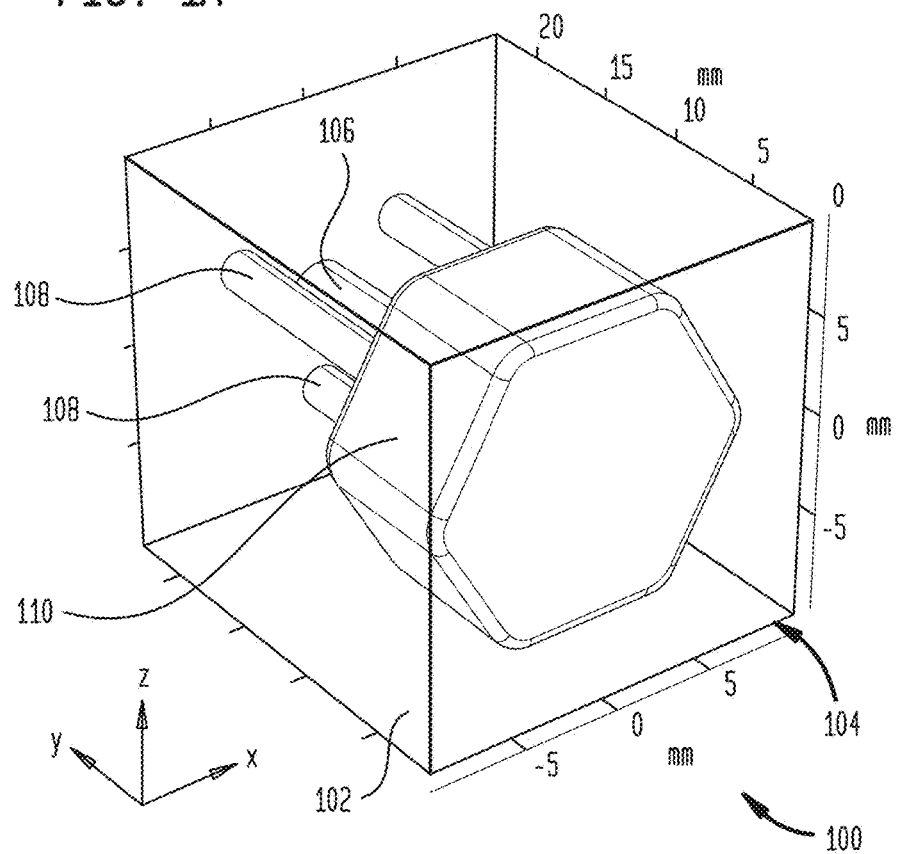
FIG. 1(a) illustrates a hexagonal flow cell embedded in a substrate, in which coolant flows in through a middle passage and out through three perimeter passages, according to some embodiments. The optical surface is the X-Z plane located at y=0.
Figure 1B:
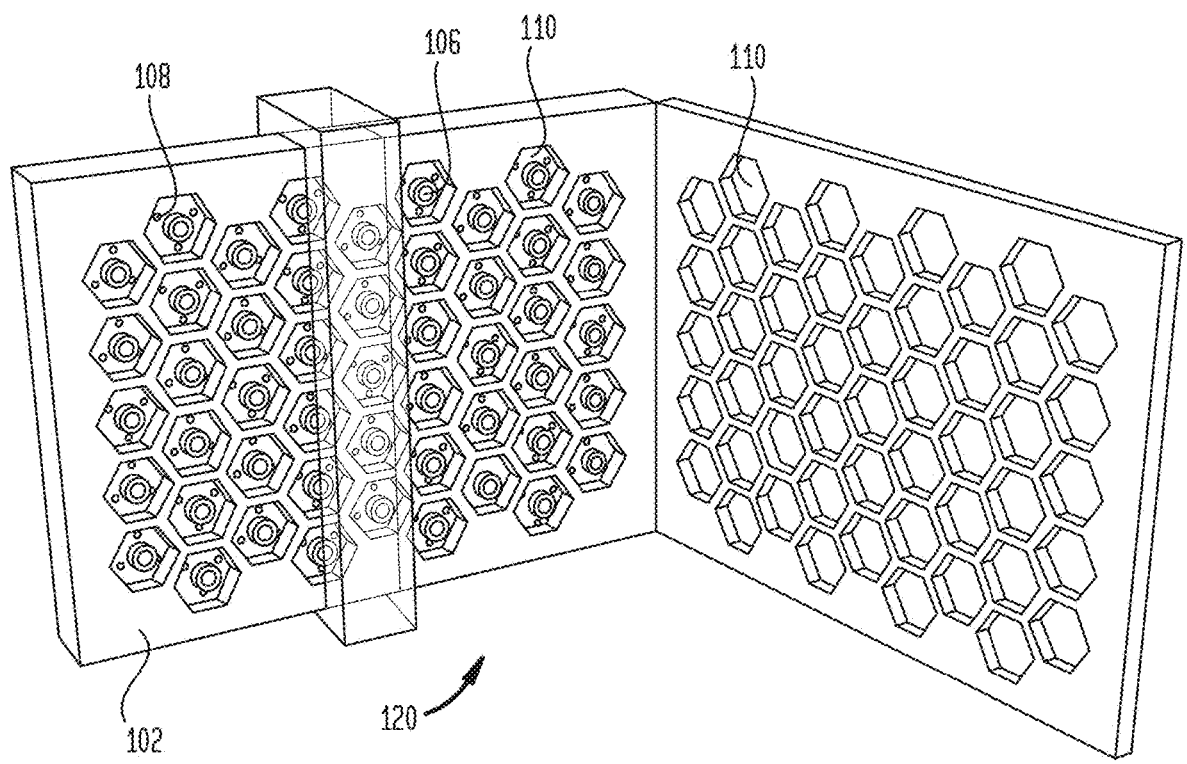
FIG. 1(b) illustrates a notional 6"×4.5" W×H substrate separated into two pieces for viewing purposes and comprising an array of flow cells according to some embodiments.
Figure 1C:
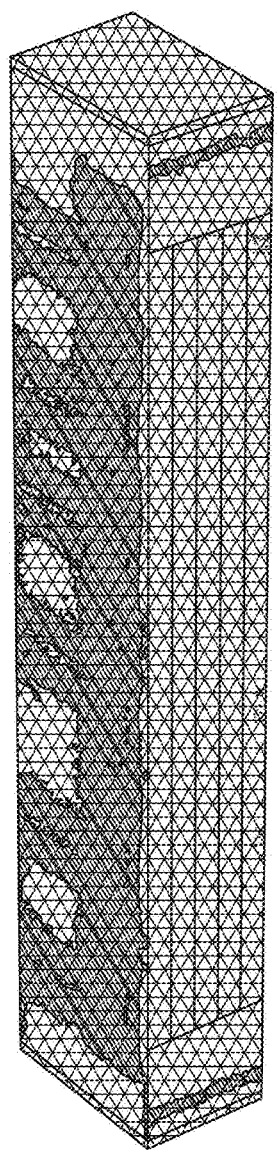
FIG. 1(c) illustrates a single-period slice taken from the shaded area shown in FIG. 1(b), and also demonstrates the mesh used for finite element modeling.

FIG. 1(a) is a perspective view of one of the flow cells that are seen in a partial opened structure in FIG. 1(b) and in a perspective view of a single-period slice in FIG. 1(c), according to some embodiments. In FIG. 1(a), a coolant cell 100 comprising a cube or box of substrate material 102 has a reflective or diffractive optical surface 104 at its front and internal passages for coolant connecting the back face of the cell to a hollow chamber 110 near front face 104. The passages comprise an inlet passage 106 and four outlet passages 108. Chamber 110 has an area in the indicated xz plane that preferably is a large fraction of the area of front face 104 such as most of that area. Coolant from an external reservoir (not shown) flows to chamber 110 through a central inlet passage 106 out of chamber 110 through three perimeter outlet passages 108. Preferably, the front face of chamber 110 is as close to front face 104 as fabrication technology allows, e.g., chamber 110 is recessed a few mm from front face 104, such as 5 mm, or 3 mm, or 2 mm or some other small distance. Machinable ceramics that can have front face 104 fabricated as a mirror or a diffraction grating are desirable materials for cell 100. Preferable materials are low-expansion cordierite ceramics ($2MgO-2Al_2O_3-5SiO_2$) that have been used in mirror fabrication, as discussed in J. Sugawara and C. Maloney, "Manufacturing aspheric mirrors made of zero thermal expansion cordierite ceramics using magnetorheological finishing (MRF)," Proc. SPIE 9912, 99120L (2016). A coolant reservoir (not shown) is connected to the inlet passages 106 through a coolant pump (not shown) and the outlet passages 108 flow coolant back to the reservoir either directly or through a pump. The reservoir may be cooled by a suitable cooling system or may simply be large enough to maintain a desirable coolant temperature that is unaffected for practical purposes by small amounts of coolant flowing through the optic device.

FIG. 1(b) shows in perspective a substrate separated into two pieces for viewing purposes. The substrate comprises many cells such as cell 100. The right-hand panel shows a periodic 2D pattern of portions of chambers 110 while the left panel shows the remaining portions of chambers 110 as well as inlet passages 106 and outlet passages 108. FIG. 1(c) shows in perspective a single-period slice from an entire structure 130 in which a front face 132 is a mirror or diffraction grating, chambers 110 are internal and are visible in slice plane as ultra-densely meshed areas immediately behind the front face 132, and passages 106 and 108 are internal and exit the device from a surface that is not visible.

In operation of the illustrated structure, an array of inlet and outlet passages flows coolant in and out of chambers 110 to extract heat from substrate 102. A hexagonal lattice need not be the only geometry and the illustrated shape of chambers 110 and the configuration of coolant passages can be different. For example, smaller reflecting parts (2" or smaller) may be able to make use of regular arrays of square-shaped or triangular-shaped chambers. The shape of structure 130 need not be as shown in FIG. 1(c). For example, the mirror of diffraction grating can be circular or shaped in some other way, and front face 132 need not conform to a flat plane but can be concave or convex or have some other departure from planarity. The regular array of flow cells shown in FIGS. 1(a)-1(c) can mitigate problems found with simple sub-surface piping as coolant in the new design is brought in from the rear, extracts heat at the front of the flow cell, and quickly exits again to the rear before becoming undesirably hot.

The geometry of flow-cell 100 shown in FIG. 1(a) is only one example of a flow-cell according to the new approach described in this patent specification. Other geometries are possible that provide like active cooling results, such as differently shaped chambers 110 and differently shaped or arranged inlet passage or passages and outlet passage or passages. In addition, the shape and size of the entire optic device that is cooled according to the disclosure of this patent application can be different and adapted for a specific purpose.

A simulation performed in COMSOL Multiphysics, a general-purpose finite element method toolkit with broad capabilities, demonstrates benefits of the new approach but does not indicate performance limits or optimized geometry or materials choices. The simulations involve 3D modeling of hexagonal flow cells as illustrated in FIGS. 1(a)-1(c). Not shown is a perimeter mounting scheme for the optic, although the forces imparted by such a mount are accounted for. Connectorization of the flow cells is ignored. An initial model uses a monolithic silicon carbide (SiC) structure and the following key features/parameters:

Flow cells recessed 2 mm from the front surface, inscribed Ø1.5 cm 4.5" tall part, 80% clear aperture assumed Wave spring mounting using shims to distribute pressure top and bottom; front contact with mount assumes no mount motion, rear contact with mount uses spring forces to clamp the optic in place Model simplification achieved using symmetry boundary conditions for a ½-period width (infinitely wide part)

2.5 W/cm² absorbed thermal power density over the entire clear aperture (top-hat illumination); this corresponds to 100 mJ/cm² fluence at 1 kHz with 2.5% absorption (5% is a realistic estimate for a standard Au coating)

Inlet velocity 20 cm/s, temperature 10° C.

Figure 2A:
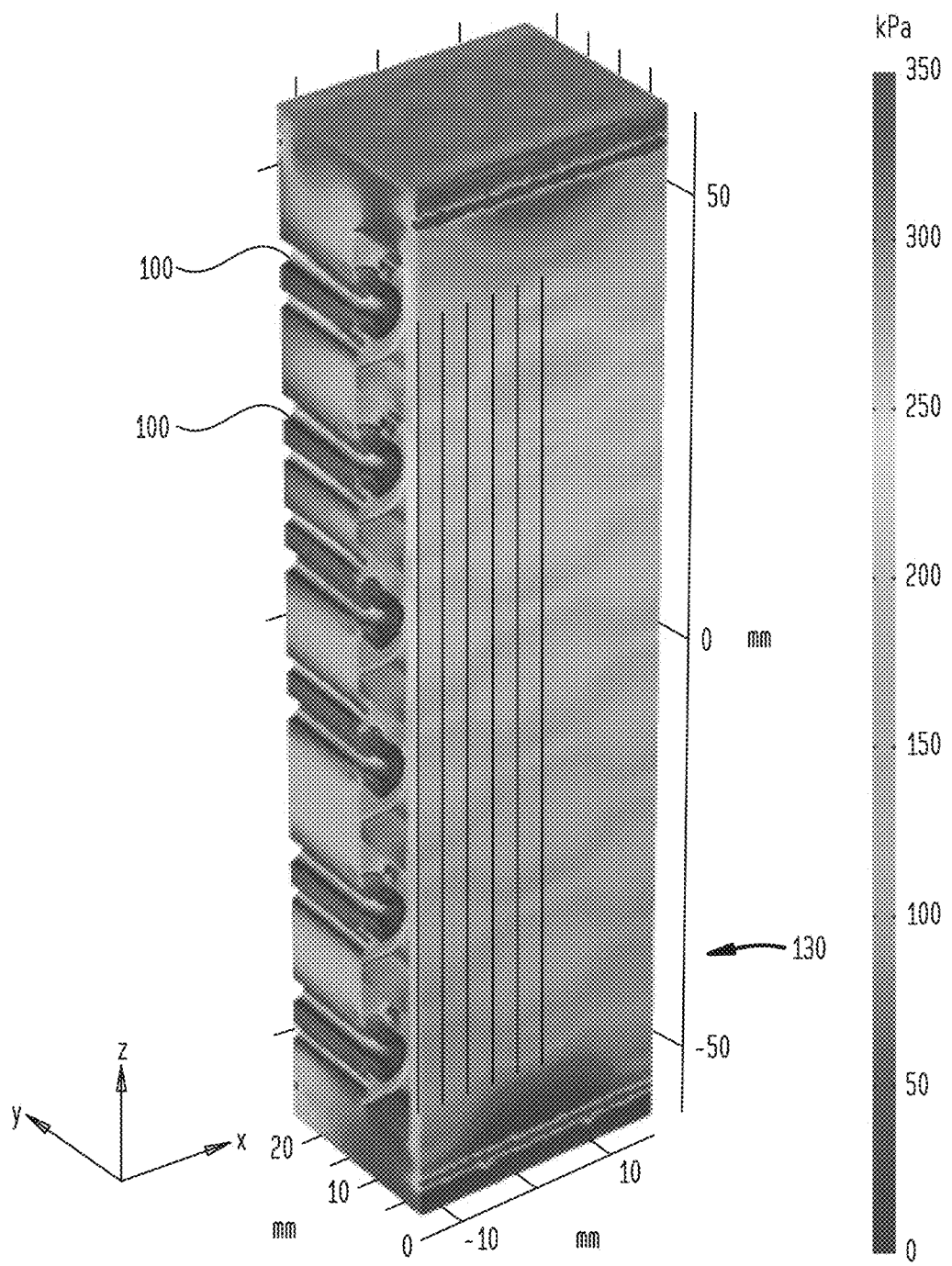
FIG. 2(a) illustrates a stress map flow cell print-through according to some embodiments. High stress lines at the top/bottom are where an optic device contacts a mount according to some embodiments.
Figure 2B:
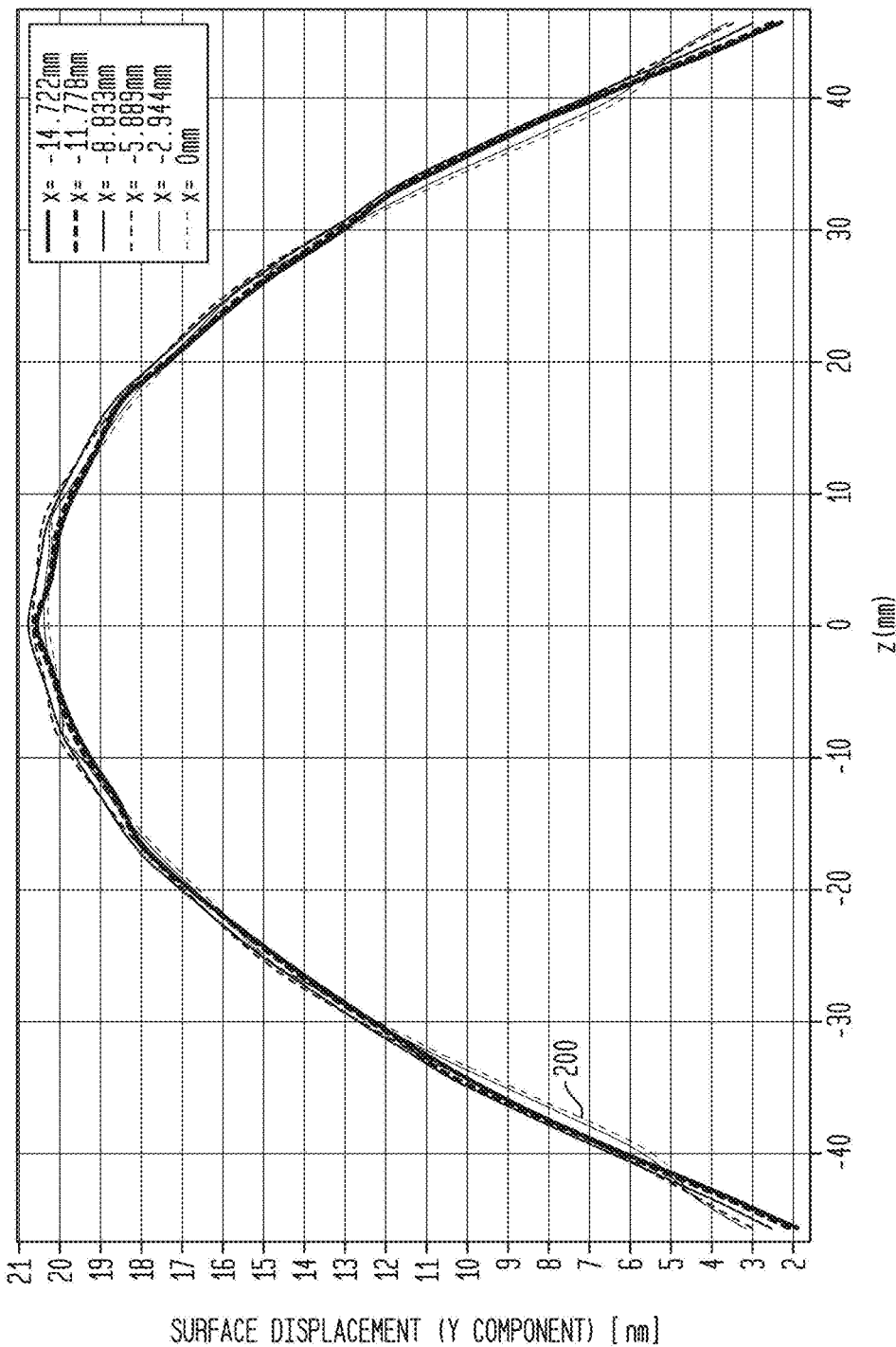
FIG. 2(b) illustrates displacement lineouts taken along vertical lines shown in FIG. 2(a).

Model includes non-isothermal turbulent flow, fluid-structure interaction, and thermal expansion of solids multi-physics couplings Gravity included FIGS. 2(a)-2(b) and 4(a)-4(b) show stress parameters for the optic device used in the simulation described above. FIG. 2(a) is like FIG. 1(c) except for showing a different perspective and a section through a column of flow cells. FIG. 2(a) is a stress map for an optic device held in a mount (not shown), when there is no thermal load on the device and no cooling flow through cells 100. The top and bottom, where the optic device mounts are, show higher stress than the intermediate portion. FIG. 2(b) shows graphs of displacement of the front face of the optic device that would serve as a reflective or diffraction grating surface. The horizontal scale in FIG. 2(b) is location in mm along the z-axis of the optic device and the vertical scale is displacement in the y-direction in nm of the front face of the device. Curves 200 show displacement in nm in the y-direction at locations along respective vertical lines seen in FIG. 2(a) at the front face of the optic device. The curves are nearly the same, showing the greatest displacement (just under 21 nm) at about mid-height of the optic device 130.

Figure 3A:
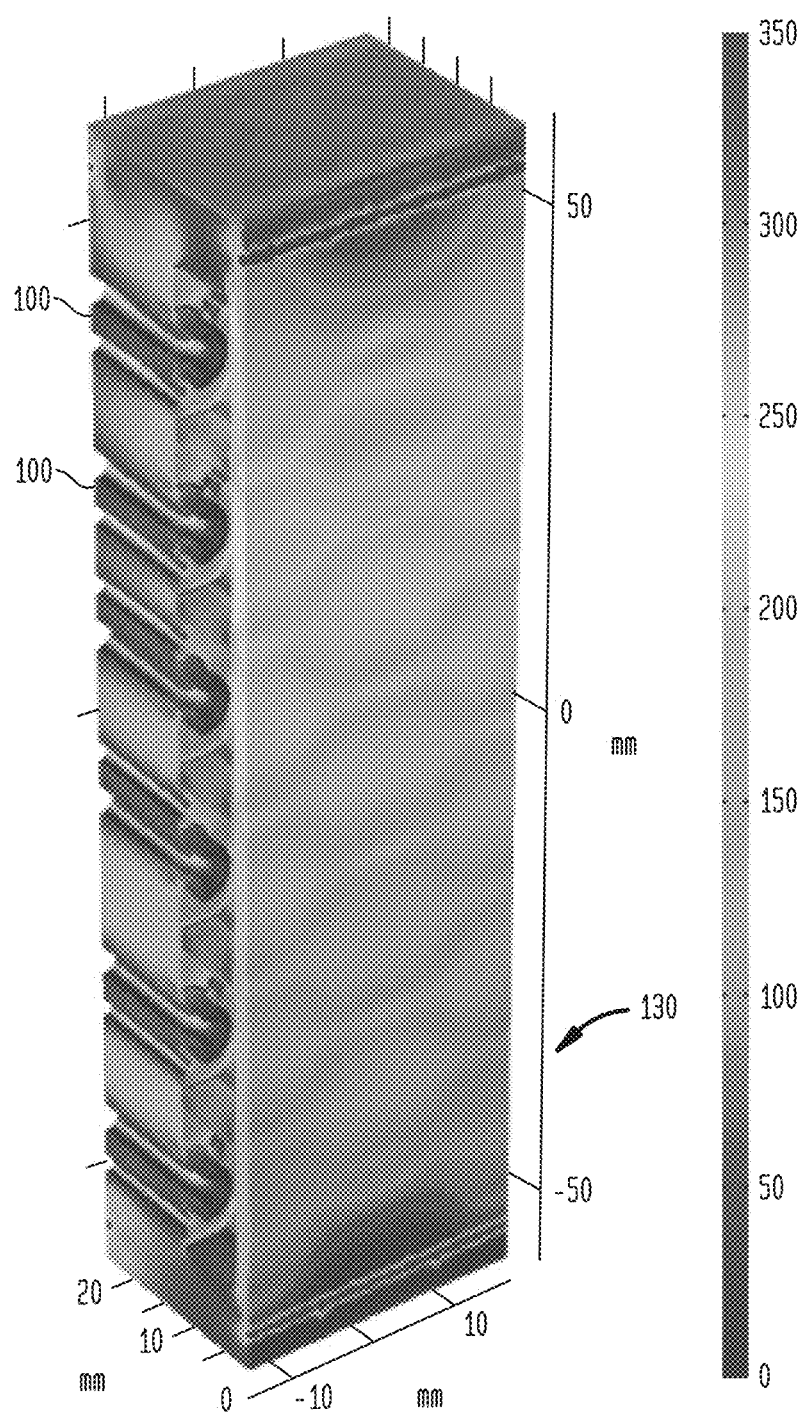
FIG. 3(a) illustrates a stress map when absorbed thermal power density and coolant flow are present.
Figure 4A:
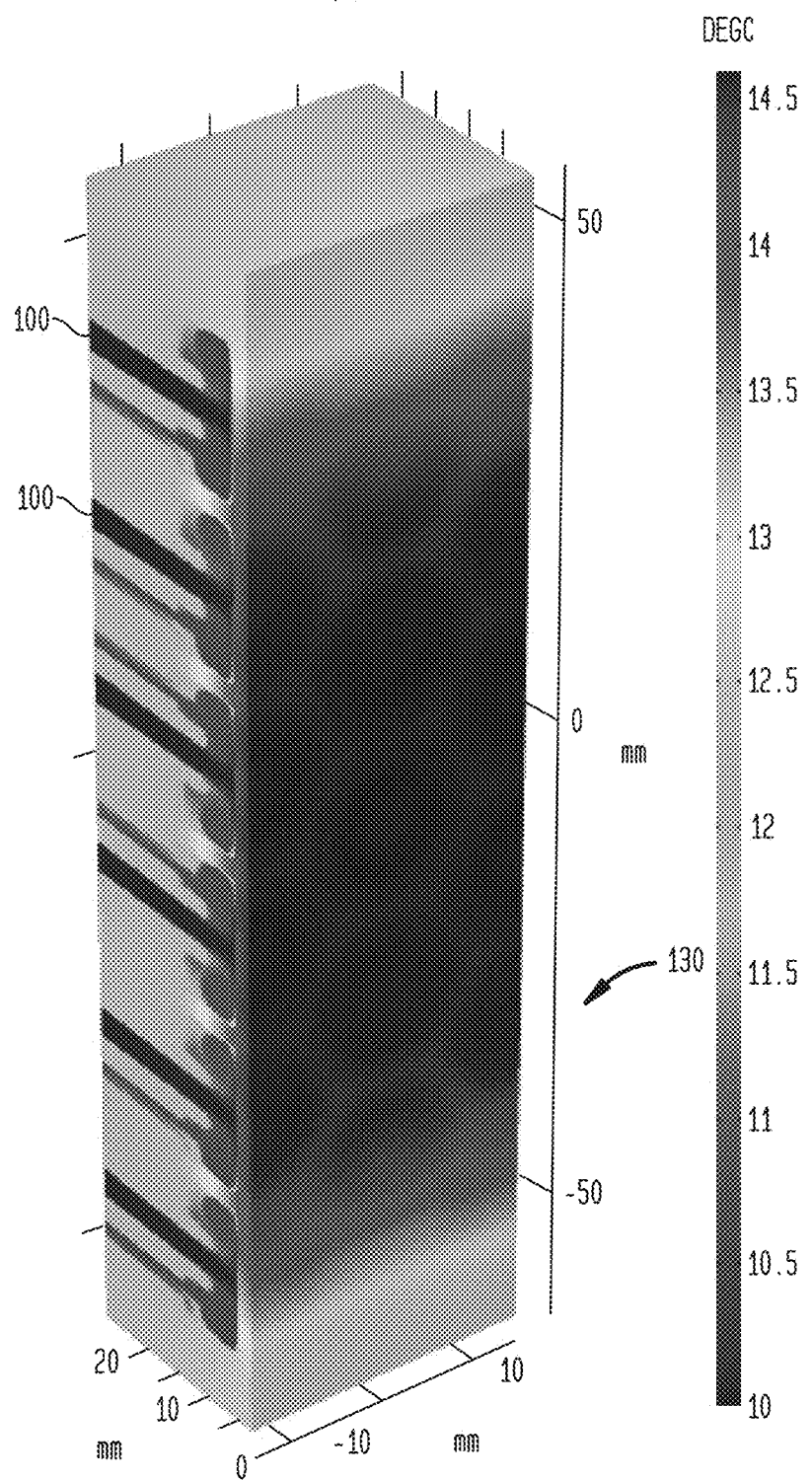
FIG. 4(a) shows a surface thermal map and print-through from the flow cells and FIG. 4(b) illustrates non-isothermal flow in flow cells according to some embodiments.
Figure 4B:
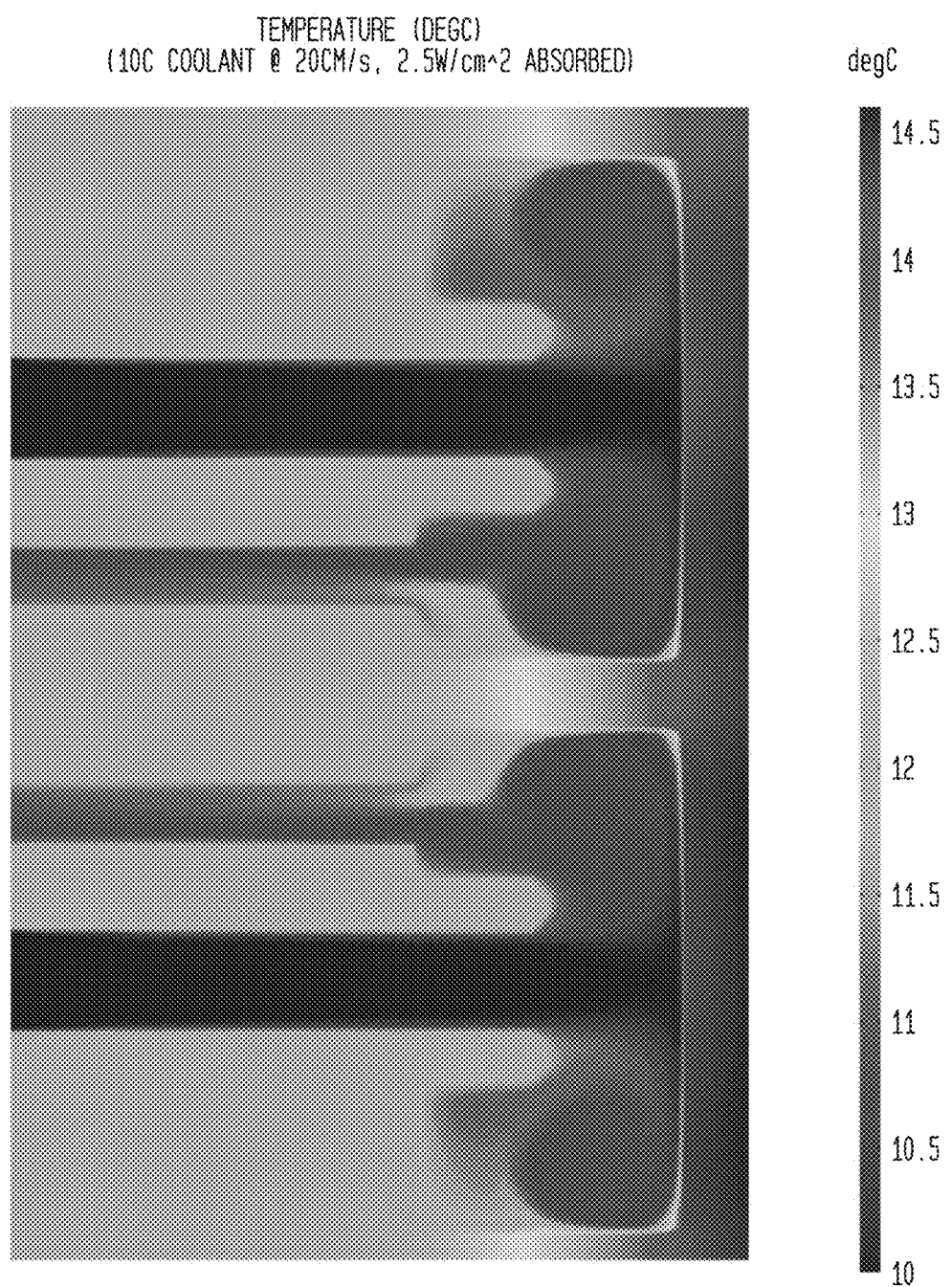

FIGS. 3(*a*) and 3(*b*) show simulation results when thermal stress on optic device 130 and cooling flow through cells 100 are present. FIG. 3(*a*) is like FIG. 2(*a*) except that it pertains to different conditions—with thermal stress resulting from the absorbed thermal power density and with cooling flow as described above for the simulation parameters. FIG. 3(*b*) shows displacement of the front (reflective or diffractive) surface of optic device 130 in the specified conditions. The horizontal scale is like in FIG. 2(*b*) but the vertical scale is displacement in nm in the y-direction due to thermal load and cooling flow. Curves 300 are for locations along respective vertical lines seen in FIG. 2(*b*). The displacements that curves 300 show are nearly the same for all those vertical lines. The greatest displacement is just under 9 nm and is just above the vertical middle of optic device 130.

FIGS. 4(*a*) and 4(*b*) show a surface thermal map for the simulation results when thermal stress on optic device 130 and cooling flow through cells 100 are present. FIG. 4(*a*) is like FIG. 2(*a*) except that it shows absolute temperature distribution at the front surface of optic device 130. FIG. 4(*b*) shows a zoomed-in view of the left side of FIG. 4(*a*) and illustrates non-isothermal flow through cells 100. The high thermal conductivity of the SiC material used in simulation, combined with sufficient heat extraction due to the cooling flow, result in a front surface temperature <15° C. Ambient temperature for a perfectly flat front surface was set to 20° C. in the simulation. A thicker front layer, i.e. distance between right side in FIG. 4(*a*) and right edge of cells 100, and/or warmer initial coolant temperature can compensate and bring the surface closer to 20° C. The preferred route can be a thicker front layer for mechanical stability and ease of manufacturing.

FIG. 5 illustrates velocity streamlines in inlet passages 106, outlets passages 108 and chamber 110 of a cell 100 for the simulation described above. As illustrated, there is no stagnant flow that can cause hot spots.

FIG. 6(*a*) shows simulation results of peak-to-valley deformation versus absorbed power density demonstrating that flow-cell-cooled cordierite used in active cooling as described in this patent specification can tolerate a 400-fold increase in average-power versus uncooled $SiO_2$. FIG. 6(*b*) shows peak surface temperature versus absorbed power density, and indicates flow-cell cooled cordierite can tolerate 5 W/cm$^2$ absorbed power density with a peak surface temperature <100° C.

High-average-power short-pulse lasers present unique thermal management challenges. A smaller beam diameter is desirable for many reasons: optic size and cost reductions, better wavefront quality of smaller optic, etc. For low-repetition-rate, high-peak-power systems, laser-induced-damage threshold (LIDT) is a key limiter on beam size. Thermal loading of mirror and grating substrates in high-average-power systems introduces a more-restrictive upper bound on tolerable fluence due to the thermal expansion of the substrate and subsequent wavefront degradation. Two complementary approaches are known for addressing the problem of increased heat: develop coatings with lower absorption while maintaining high LIDT and meeting bandwidth requirements, as discussed in D. A. Alessi, H. T. Nguyen, J. A. Britten, P. A. Rosso, and C. Haefner, "Low-dispersion low-loss dielectric gratings for efficient ultrafast laser pulse compression at high average powers," Opt. Laser Technol. 117, 239-243 (2019), and/or engineer the substrate for efficient heat removal and thermal stability. Reducing absorption yields benefits, but residual absorption exists that requires thermal management. Active cooling of thermally stable substrate materials reduces thermal expansion with the goal of eliminating the above described "average-power penalty" for diffraction gratings and achieving LIDT-limited operation. While diffraction grating substrates are a target application, like active cooling is valid for transport mirrors in high-average-power systems.

The active cooling approach described in this patent specification compares very favorably with known passive cooling approaches. Passively cooled reflective optic components rely on the thermal stability of a substrate and radiative/convective cooling to remove waste heat. Among the active cooling schemes considered that are known to be under consideration, only edge cooling is believed to have been demonstrated, and only at a proof-of-concept level. Back cooling is a more challenging geometry since the thermal interface should have minimal applied pressure and maintain contact under varying thermal conditions. Flow-cell cooling is a more-complex geometry but simulations such as discussed above show significant benefits from flowing coolant as close to the absorbing (reflective) surface as possible. The simulations described in connection with FIGS. 2(*a*)-5 refer to using a monolithic silicon carbide (SiC) structure. However, low-expansion cordierite ceramics ($2MgO-2Al2O3-5SiO2$) may be better in some respects. Such cordierite ceramics have been used in mirror fabrication, as discussed in J. Sugawara and C. Maloney, "Manufacturing aspheric mirrors made of zero thermal expansion cordierite ceramics using magnetorheological finishing (MRF)," Proc. SPIE 9912, 99120L (2016). High thermal conductivity ceramics such as SiC or ultra-low expansion ceramics such as cordierite can be machined and sinter bonded into the required structure.

Consider a diffraction grating fabricated on a fused-silica substrate with a broadband gold coating. The LIDT for such an optic is typically in the 300 mJ/cm$^2$ range, see P. Poole, S. Trendafilov, G. Shvets, D. Smith, and E. Chowdhury, "Femtosecond laser damage threshold of pulse compression gratings for petawatt scale laser systems," Opt. Express 21, 26, 341-26,351 (2013), and operation is usually limited to less than 100 mJ/cm$^2$ in a single-shot mode. Next, consider operating a laser using this grating at a 1 kHz repetition rate, and assume for simplicity that absorption of the gold coating is 5%. The dashed curve 602 in FIG. 6(*a*) shows that $\lambda/10$ peak-to-valley thermal deformation is exceeded when the absorbed power density reaches approximately 31 mW/cm$^2$, which translates to 620 µJ/cm$^2$ single-shot optical fluence (assuming laser wavelength $\lambda_0$=800 nm). One of the few experimental studies to date showed that operating gold gratings on Pyrex with optical power densities exceeding 145 mW/cm$^2$ significantly degraded the wavefront. See V. Leroux, S. W. Jolly, M. Schnepp, T. Eichner, S. Jalas, M. Kirchen, P. Messner, C. Werle, P. Winkler, and A. R. Maier, "Wavefront degradation of a 200 TW laser from heat-induced deformation of in-vacuum compressor gratings," Opt. Express 26, 13,061-13,071 (2018). This corresponds to a fluence of only 145 µJ/cm$^2$ at 1 kHz and therefore a nearly 700× reduction in the maximum allowable optical fluence.

FIGS. 6(*a*) and 6(*b*) compare passive, edge, and flow-cell cooling using two substrate materials: fused silica and cordierite ceramic. To provide results relevant for different coating types, performance can be characterized in terms of absorbed power density rather than incident optical power. For comparison purposes, all substrate sizes have dimensions of 12.7×6.35×2.54 cm$^3$ except for the flow-cell design described in this patent specification—dimensions for this part are 12.7×6.35×4.3 cm³. Dimensions are for a grating with an incidence angle of 56°, 80% clear aperture, and 05 cm beam. Fixed-temperature surfaces for edge-cooled models were set at 20° C. Input coolant temperature for the flow-cell design was set at 17° C., with a 5.3 L/min flow rate. Radiative cooling and gravity were enabled for all models, and vacuum operation was assumed.

Figure 6A:
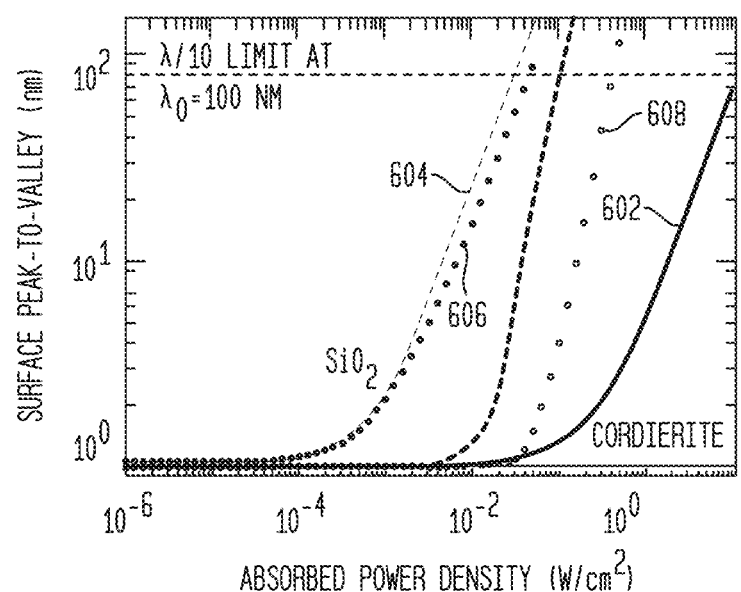
FIGS. 6(a) and 6(b) compare passive, edge, and flow-cell cooling using two candidate substrate materials: fused silica and cordierite ceramic.
Figure 6B:
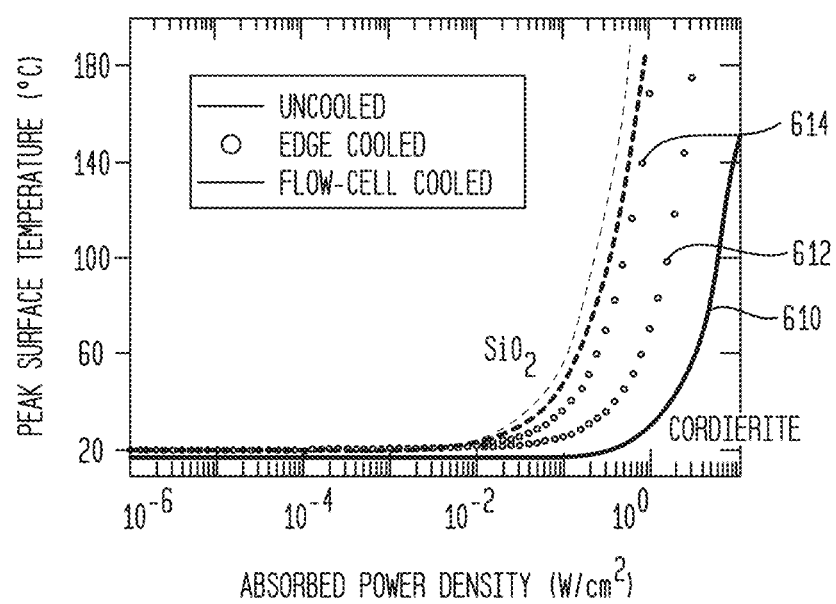

As can be seen in FIG. 6(a), the flow-cell cooling geometry using cordierite (curve 602) as described in this patent specification offers a power-handling improvement of 400× over uncooled $SiO_2$ (curve 604), 250× over edge-cooled $SiO_2$ (curve 606) and 12.5× over edge-cooled cordierite (curve 608). Peak surface temperatures are also of some importance—excessively high temperatures could bleed into the optical mount and cause unwanted expansion in mount metal and/or additional optical coating stress and increased probability of coating failure. At 5 W/cm² absorbed power density, flow-cell—cooled cordierite reaches a peak surface temperature of 84° C. As seen in FIG. 6(b), flow-cell cooled cordierite (curve 610) also demonstrates significant improvement in peak surface temperature over edge-cooled cordierite (curve 612), and over edge cooled $SiO_2$ (curve 614).

Although the foregoing has been described in some detail for purposes of clarity, it will be apparent that certain changes and modifications may be made without departing from the principles thereof. There can be many alternative ways of implementing both the processes and apparatuses described herein. Accordingly, the present embodiments are to be considered as illustrative and not restrictive, and the body of work described herein is not to be limited to the details given herein, which may be modified within the scope and equivalents of the appended claims.

The invention claimed is:

1. An actively cooled optic device comprising:
a substrate having a front configured to reflect or diffract visible or IR light and a back;
a plurality of individual chambers in said substrate recessed from said front by no more than 10 mm; and
passages that connect said back to said chambers and are configured for coolant flow between said back and said chambers;
wherein said passages comprise at least one inlet passage and at least one outlet passage from said back to each of said chambers.

2. The actively cooled optic device of claim 1, wherein the passages to and from each respective chamber are configured for coolant flow transverse to said front face that maintains said front surface at flatness of <1/10$^{th}$ wave thermal deformation at absorbed power density greater than 100 mW/cm² in response to illumination with visible or near-IR light in ambient temperature no less than 10° C.

3. The actively cooled optic device of claim 1, in which said substrate comprises cordierite.

4. The actively cooled optic device of claim 1, in which said substrate comprises a material selected from the group of silicon carbide and other machinable, bondable, and optically-polishable materials with low or ultra-low thermal expansion coefficient and moderate to high thermal conductivity.

5. The actively cooled optic device of claim 1, in which said chambers are recessed from said front by no more than 5 mm.

6. The actively cooled optic device of claim 1, in which said chambers are recessed from said front by no more than 2 mm.

7. The actively cooled optic device of claim 1, in which said chambers have dimensions no more than 2 cm in a section parallel to said front.

8. The actively cooled optic device of claim 1, in which said chambers are arranged in a periodic array.

9. The actively cooled optic device of claim 1, in which the passages comprise, for each of said chambers, a central inlet passage and plural outlet passages at a perimeter of the chamber.

10. The actively cooled optic device of claim 1, in which said inlet passages are configured for inflow of coolant at velocity in the range of at least 10 cm/sec.

11. The actively cooled optic device of claim 1, in which said front deforms by no more than 100 nm at absorbed power density greater than 100 mW/cm².

12. An actively cooled optic device comprising:
a substrate that has a front configured to reflect or diffract visible or near-IR light and a back and a plurality of chambers recessed from said front;
inlet passages and outlet passages extending from said back surface to said chambers in a direction transverse to said front;
wherein at least one inlet passage and at least one outlet passage are in coolant flow communication with each of said chambers.

13. The actively cooled optic device of claim 12, in which said substrate comprises cordierite.

14. The actively cooled optic device of claim 12, in which said substrate comprises a material selected from the group of silicon carbide and other machinable, bondable, and optically-polishable materials with low or ultra-low thermal expansion coefficient and moderate to high thermal conductivity.

15. The actively cooled optic device of claim 12, in which said chambers are recessed from said front by no more than 5 mm.

16. The actively cooled optic device of claim 12, in which said chambers have dimensions no more than 2 cm in a section parallel to said front.

17. The actively cooled optic device of claim 13, in which said inlet passages are configured for inflow of coolant at velocity in the range of at least 10 cm/sec.

18. A method of actively cooling an optic device comprising a substrate with a front configured to reflect or diffract visible or near-IR illuminating light and a back, comprising:
forming a pattern of chambers in said substrate recessed from but adjacent said front;
forming coolant inlet and outlet passages extending from said back surface to said chambers, wherein at least one of said inlet passages and at least one of said outlet passages extend to each of said chambers;
flowing coolant to said chambers through said inlet passages and exhausting coolant from said chambers through said outlet passages to maintain said front surface at a temperature range maintaining said front in surface shape with deformations not to exceed one-tenth of the illuminating optical wavelength at absorbed power density greater than 100 mW/cm².

19. The method of claim 18, in which the step of forming said pattern comprises forming the pattern in cordierite substrate.

20. The method of claim 18, in which the step of forming said pattern comprises forming the pattern in a substrate selected from the group of silicon carbide and other machinable, bondable, and optically-polishable materials with low or ultra-low thermal expansion coefficient and moderate to high thermal conductivity.

21. The method of claim 18, in which the step of forming said chambers comprises recessing said chambers no more than 5 mm from said front surface of the substrate.

22. The method of claim 18, in which the step of forming said chambers comprises recessing said chambers no more than 2 mm from said front surface of the substrate.

* * * * *